(12) United States Patent
Mantis

(10) Patent No.: US 8,561,865 B2
(45) Date of Patent: Oct. 22, 2013

(54) ORGANIZER ATTACHMENT FOR VEHICLE SUN VISOR

(76) Inventor: Lee Mantis, Charlotte, NC (US)

( * ) Notice: Subject to any disclaimer, the term of this patent is extended or adjusted under 35 U.S.C. 154(b) by 930 days.

(21) Appl. No.: 11/588,810

(22) Filed: Oct. 27, 2006

(65) Prior Publication Data

US 2007/0039984 A1    Feb. 22, 2007

Related U.S. Application Data

(63) Continuation-in-part of application No. 10/783,403, filed on Feb. 20, 2004, now abandoned, which is a continuation of application No. 10/113,057, filed on Apr. 1, 2002, now abandoned.

(51) Int. Cl.
B60R 7/05 (2006.01)

(52) U.S. Cl.
USPC .................................. 224/312; 224/901.8

(58) Field of Classification Search
USPC ........... 224/400, 312, 282, 901, 901.2, 901.4, 224/901.6, 901.8, 647, 648, 646, 680, 258, 224/483; 206/308.1; 296/97.5
See application file for complete search history.

(56) References Cited

U.S. PATENT DOCUMENTS

| | | | |
|---|---|---|---|
| 4,781,409 A | 11/1988 | Harbison | |
| 4,850,502 A * | 7/1989 | Davis | 220/759 |
| 5,301,856 A | 4/1994 | Newsome | |
| 5,345,633 A * | 9/1994 | Harnish | 5/639 |
| 5,402,924 A | 4/1995 | Gilson | |
| 5,433,362 A | 7/1995 | Battaglia | |
| 5,503,316 A | 4/1996 | Stewart | |
| 5,590,827 A | 1/1997 | Nimpoeno | |
| D381,947 S | 8/1997 | Bergh | |
| 5,653,364 A | 8/1997 | Eskandry | |
| D386,146 S | 11/1997 | Fai | |
| 5,762,246 A | 6/1998 | Drew | |
| 5,836,488 A * | 11/1998 | Priestley | 224/222 |
| D402,624 S | 12/1998 | Patterson | |
| D415,731 S | 10/1999 | Bergh | |
| 6,024,400 A | 2/2000 | Donoughe | |

(Continued)

FOREIGN PATENT DOCUMENTS

JP    2000107341    4/2000

OTHER PUBLICATIONS

Case Logic, Automotive Visor Products, pp. 1-5, published prior to Apr. 1, 2002.

*Primary Examiner* — Justin Larson

(57) ABSTRACT

An organizer attached for use in combination with a vehicle sun visor. The vehicle sun visor has inside and outside major visor surfaces. The sun visor is pivotable between a raised position wherein the inside visor surface resides adjacent an interior ceiling of the vehicle, and a lowered position wherein the outside visor surface resides adjacent a front windshield of the vehicle. The organizer attachment includes an organizer panel having opposing planar inside and outside major panel surfaces. The inside panel surface defines a first fastener area incorporating one of hook and loop fasteners. At least one visor strap is attached to the sun visor, and is separate and detachable from the organizer panel. The visor strap defines a second fastener area incorporating one of hook and loop fasteners adapted for releasably mating with the first fastener area of the organizer panel. The organizer attachment is readily removed from the sun visor and the visor strap for transport outside of the vehicle. The first fastener area of the organizer panel is greater than the second fastener area of the visor strap.

7 Claims, 10 Drawing Sheets

(56) References Cited

U.S. PATENT DOCUMENTS

| | | |
|---|---|---|
| D432,490 S | 10/2000 | Golenz |
| D434,368 S | 11/2000 | Eskandry |
| D435,511 S | 12/2000 | Eskandry |
| 6,176,539 B1 | 1/2001 | Westerman |
| 6,659,529 B2 | 12/2003 | Palmer et al. |
| 6,742,636 B2 | 6/2004 | Godshaw |

* cited by examiner

ORGANIZER ATTACHMENT FOR VEHICLE SUN VISOR

TECHNICAL FIELD AND BACKGROUND OF INVENTION

This application relates to an organizer attachment for a vehicle sun visor. The invention provides multiple object storage areas for organizing and conveniently storing items commonly used or carried in a vehicle. The invention is especially applicable for holding compact discs and cassette tapes. In other applications, the invention may be used for storing note pads, pens, money, vehicle registration, insurance cards, and the like.

Visor attachments for vehicles are well known in the art. These attachments are typically secured to one side of the visor, and include only one or two major surface areas for object storage. For many users, this limited storage area is sufficient. Other users, however, desire substantially greater storage area, and more particularly, storage area especially designed for holding compact discs and cassette tapes. One possible solution to this problem is to increase the number of organizer panels attached to the visor. However, because the visor is generally held by friction in a desired position selected by the vehicle occupant, the added weight of multiple panels would tend to pivot the panel vertically down allowing little or no angle of adjustment.

A further limitation of prior art visor attachments is their inability to be readily detached from the vehicle visor in order to carry the stored CDs, cassettes, or other objects outside of the vehicle. Most commercially available attachments are secured to the vehicle visor using straps with mating hook and loop fasteners, such as VELCRO®. The straps extend around the visor and are releasably secured to each other at their respective free ends. The process of detaching and reattaching the straps when moving the visor attachment into and out of the vehicle is generally time-consuming and inconvenient.

The present invention addresses these and other problems of the prior art by providing a visor organizer attachment which provides maximum storage space with minimal weight and bulk. In one application, the invention includes three storage areas of even dimension on two organizer panels in which an occupant of the vehicle can store compact discs, cassette tapes as well as other accessories. A third organizer panel may be releasably attached to the organizer attachment and most other attachments to provide more area for storing objects such as compact discs. The invention is conveniently detached and reattached to the vehicle visor. Easy access to the vanity mirror is also a key feature.

SUMMARY OF INVENTION

Therefore, it is an object of the invention to provide an organizer attachment for a vehicle sun visor.

It is another object of the invention to provide an organizer attachment which is especially applicable for holding compact discs and audio cassettes.

It is another object of the invention to provide an organizer attachment which offers increased storage area with relatively little added weight, as compared to the prior art.

It is another object of the invention to provide an organizer attachment which includes multiple storage areas that are readily accessible to the occupant of vehicle.

It is another object of the invention to provide an organizer attachment which does not block use of the vanity mirror attached to the visor.

It is another object of the invention to provide an organizer attachment which can be easily detached from the visor in order to conveniently carry the stored objects outside of the vehicle.

It is another object of the invention to provide an organizer attachment which includes as many as five separate object storage areas of equal dimension.

These and other objects of the present invention are achieved in the preferred embodiments disclosed below by providing an organizer attachment for a vehicle sun visor having inside and outside major visor surfaces. The sun visor is pivotable between a raised position wherein the inside visor surface resides adjacent an interior ceiling of the vehicle, and a lowered position wherein the outside visor surface resides adjacent a front windshield of the vehicle. The organizer attachment includes a first organizer panel having opposing inside and outside major panel surfaces. The inside panel surface is adapted for residing adjacent the outside visor surface. The outside panel surface defines a first object storage area. At least one strap secures the first organizer panel to the vehicle sun visor. A second organizer panel is attached along a longitudinal edge of the first organizer panel, and has opposing inside and outside major panel surfaces including respective second and third object storage areas. The second organizer panel is adapted for pivoting movement between a closed position wherein the second object storage area overlies the first object storage area, and an open position for accessing each of the first and second object storage areas. The third object storage area is accessible in both the open and closed positions of the second organizer panel. Means located in each of the first, second, and third object storage areas are provided for carrying objects for ready access and use by an occupant of the vehicle.

According to another preferred embodiment of the invention, the means for carrying objects includes a plurality of sleeves adapted for receiving and storing respective compact discs.

According to another preferred embodiment of the invention, the means for carrying objects includes a plurality of utility pockets each having an elastic opening adapted for receiving and storing objects.

According to another preferred embodiment of the invention, the at least one strap includes complementary hook and loop fasteners for removably securing the first organizer panel to the vehicle sun visor.

According to another preferred embodiment of the invention, means are provided for releasably holding the second organizer panel in the closed position.

According to another preferred embodiment of the invention, the first object storage area includes a plurality of sleeves adapted for receiving and storing respective compact discs.

According to another preferred embodiment of the invention, the second object storage area includes a plurality of sleeves adapted for receiving and storing respective compact discs.

According to another preferred embodiment of the invention, the third object storage area includes a plurality of pockets each having an elastic opening for receiving and storing objects.

According to another preferred embodiment of the invention, the elastic opening extends along a lateral dimension of the second organizer panel.

According to another preferred embodiment of the invention, the elastic opening extends along a longitudinal dimension of the second organizer panel.

According to another preferred embodiment of the invention, a third organizer panel has opposing inside and outside major panel surfaces. The inside panel surface is adapted for residing adjacent to the inside visor surface of the vehicle sun visor. The outside panel surface defining a fourth object storage area. The fourth object storage area is readily accessible when the vehicle sun visor is in the lowered position.

According to another preferred embodiment of the invention, the third organizer panel is releasably attached to the at least one strap for securing the first organizer panel to the vehicle sun visor.

According to another preferred embodiment of the invention, a fastener wrap is looped around the at least one strap, and includes fastener means for engaging and securing the third organizer panel to the vehicle sun visor.

In another embodiment, the invention is an organizer attachment for a vehicle sun visor having opposing inside and outside major visor surfaces. The sun visor is pivotable between a raised position, wherein the inside visor surface resides adjacent a ceiling of the vehicle, and a lowered position wherein the outside visor surface resides adjacent a front windshield of the vehicle. The organizer attachment includes a first organizer panel having opposing inside and outside major panel surfaces. The inside panel surface is adapted for residing adjacent the outside visor surface, and the outside panel surface defines a first object storage area. At least one strap secures the first organizer panel to the vehicle sun visor. A second organizer panel is attached along a longitudinal edge of the first organizer panel, and has opposing inside and outside major panel surfaces. One of the panel surfaces includes a second object storage area. The second organizer panel is adapted for pivoting movement between a closed position overlying the first object storage area, and an open position for accessing each of the first and second object storage areas. A third organizer panel has opposing inside and outside major panel surfaces. The inside panel surface is adapted for residing adjacent to the inside visor surface of the vehicle sun visor. The outside panel surface defines a third object storage area. The third object storage area is readily accessible when the vehicle sun visor is in the lowered position. Means are located in each of the first, second, and third object storage areas for carrying objects for access and use by an occupant of the vehicle.

According to another preferred embodiment of the invention, the inside panel surface of the third organizer panel defines a fourth object storage area including means for carrying objects for access and use by the vehicle occupant.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF EXEMPLARY
EMBODIMENTS AND BEST MODE

The present invention is described more fully hereinafter with reference to the accompanying drawings, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Like numbers refer to like elements throughout. As used herein, the article "a" is intended to include one or more items. Where only one item is intended, the term "one" or similar language is used. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. Any references to advantages, benefits, unexpected results, or operability of the present invention are not intended as an affirmation that the invention has been previously reduced to practice or that any testing has been performed.

Figure 1:
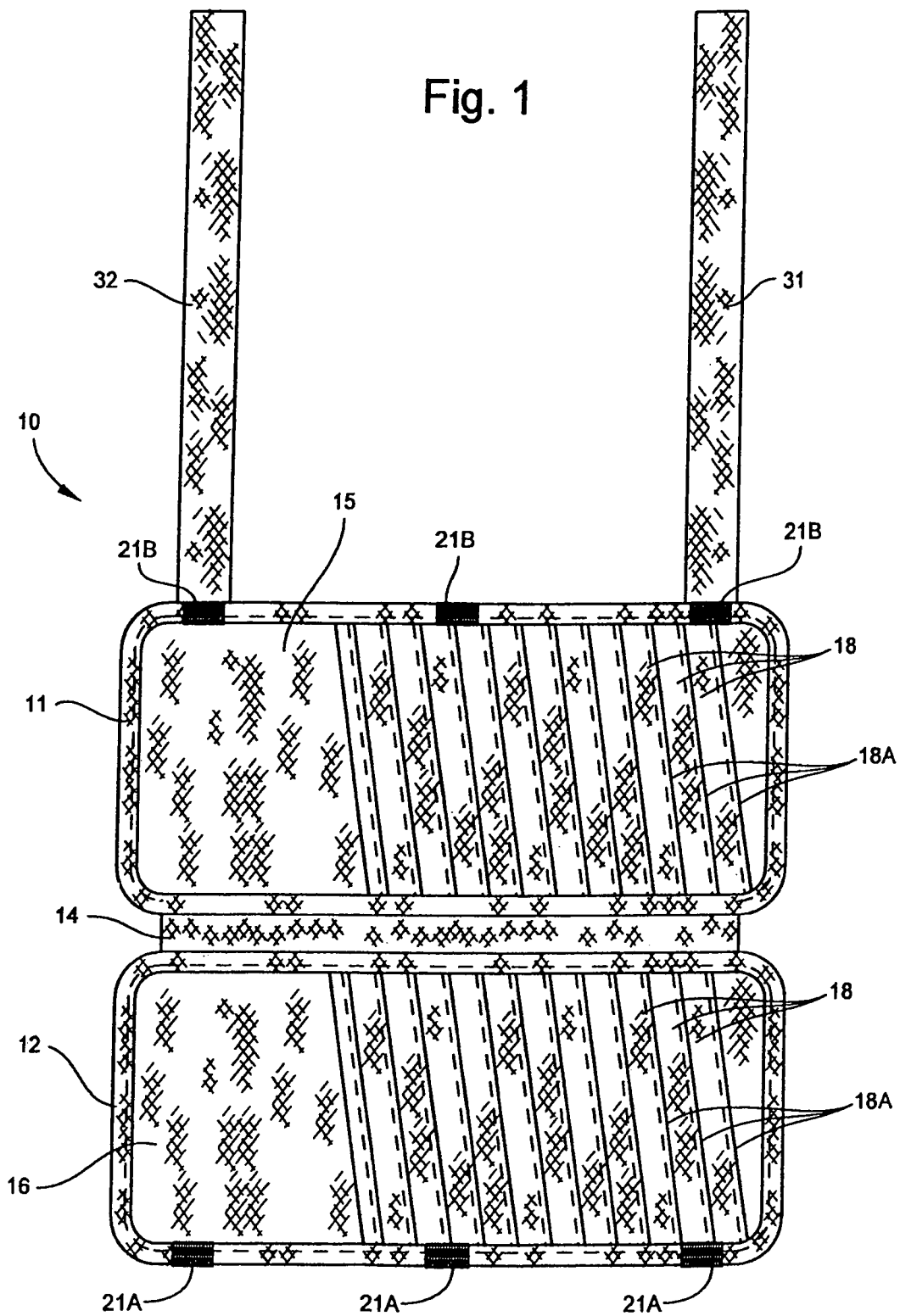
FIG. 1 shows a visor organizer attachment according to one preferred embodiment of the invention with the organizer attachment laid flat to illustrate the inside object display surfaces of the first and second organizer panels.

Referring now specifically to the drawings, an organizer attachment for a vehicle sun visor according to the present invention is illustrated in FIG. 1, and shown generally at reference numeral 10. The organizer attachment 10 is especially applicable for holding compact discs "D" and audio cassettes "C", shown in FIGS. 4, 5, and 6, for convenient and ready access by an occupant of the vehicle. The organizer attachment 10 is usable on either the driver-side or passenger-side visor, and is preferably formed of a durable lightweight fabric such as nylon.

Figure 2:
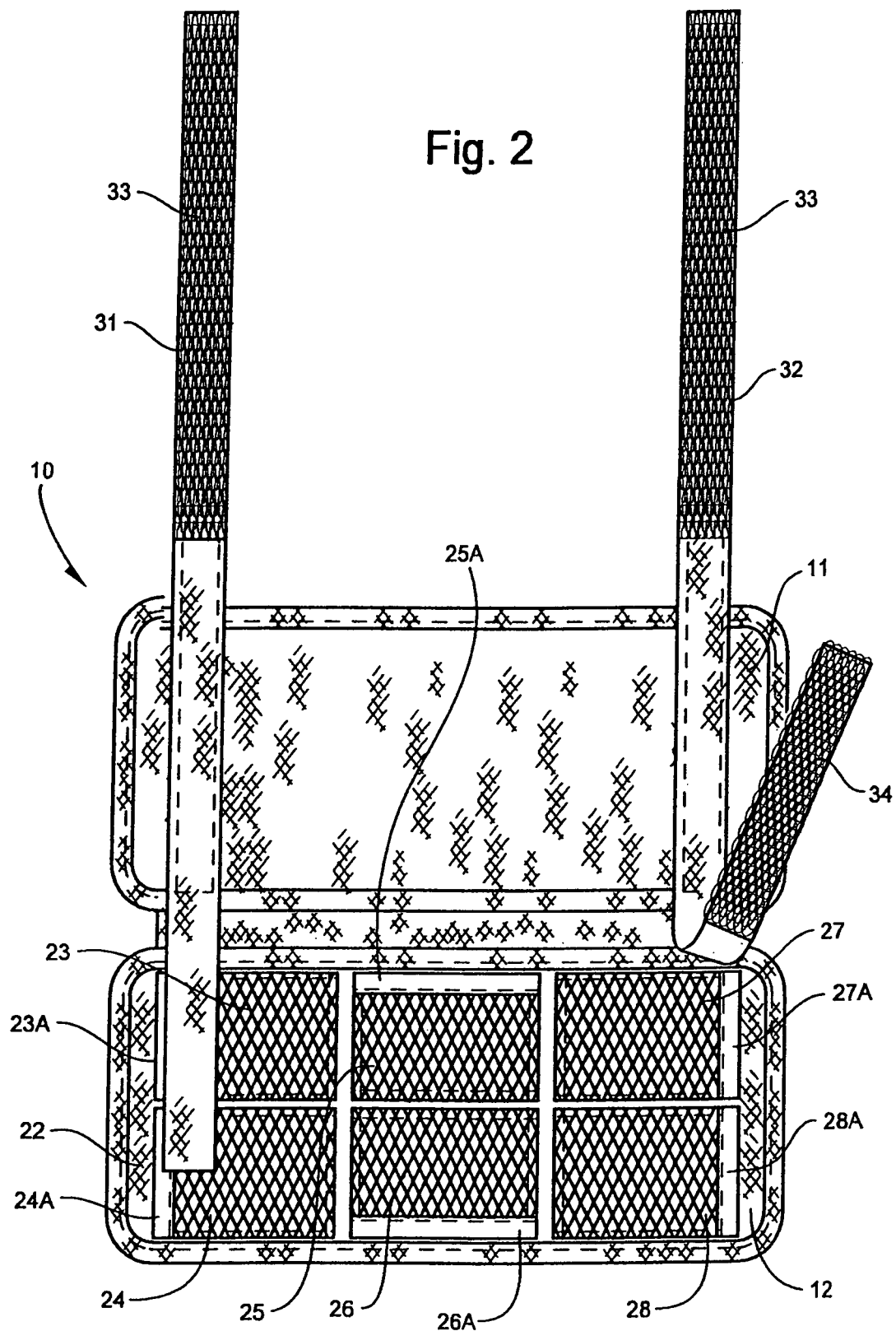
FIG. 2 shows the outside surfaces of the first and second organizer panels.

Referring to FIGS. 1 and 2, the organizer attachment 10 includes first and second organizer panels 11 and 12 interconnected along respective longitudinal edges by a flexible hinge strip 14. Each panel 11, 12 has opposing inside and outside major surfaces. The two inside panel surfaces, shown in FIG. 1, define respective object storage areas 15 and 16 including a number of CD sleeves 18 especially designed for receiving and carrying compact discs. The CD sleeves 18 are non-rigid and non-abrasive. According to one embodiment, the organizer panels 11 and 12 can carry as many as 24 compact discs. To facilitate entry and removal of the compact discs, the sleeve openings 18A are preferably angled as shown. Small complementary patches 21A and 21B of hook and loop fasteners, such as VELCRO®, are spaced-apart along marginal inside edges of the first and second panels 11, 12 to releasably fasten the first and second panels 11, 12 together in a closed position (See FIG. 4).

As shown in FIG. 2, the outside surface of the second organizer panel 12 defines a third object storage area 22 including mesh fabric pockets 23, 24, 25, 26, 27, and 28 adapted for receiving and holding audio cassettes. An elastic hem 23A, 24A, 25A, 26A, 27A, and 28A is formed at the opening of each pocket 23-28 to retain the cassettes in the pockets 23-28. Preferably, the elastic hems 23A, 24A, 27A, and 28A of the end pockets 23, 24, 27, and 28 are arranged laterally to permit easier access to the pockets from opposite ends of the panel 12. The elastic hems 25A and 26A of the middle pockets 25 and 26 extend along a length of the panel 12. In an alternative embodiment (not shown), the third object storage area 22 includes additional CD sleeves for receiving and storing respective compact discs.

Figure 3:
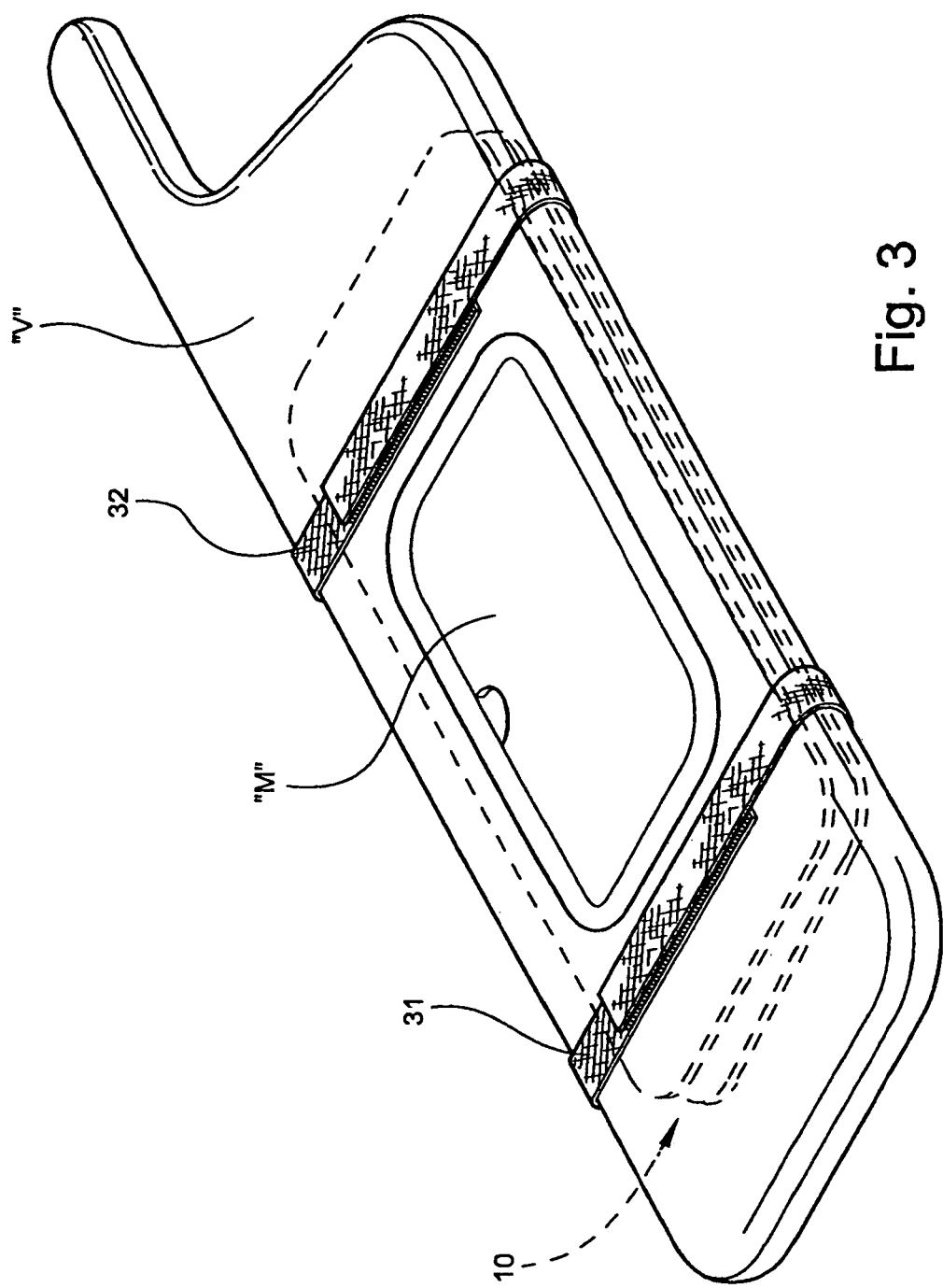
FIG. 3 is a perspective view of a vehicle sun visor with the organizer attachment of the present invention secured to the visor by releasable straps.

A pair of flexible nylon straps 31 and 32 are sewn to the outside surface of the first organizer panel 11. The straps 31 and 32 are adapted for extending around the vehicle visor "V", as shown in FIG. 3, to position the organizer attachment 10 adjacent an outside surface of the visor. Preferably, the straps 31 and 32 are sufficiently spaced-apart to avoid interfering with use of the vanity mirror "M" located on an inside surface of the visor "V". Complementary hook and loop fasteners 33 and 34, such as VELCRO®, are formed with free ends of the straps 31, 32, and cooperate when mated to releasably secure the organizer attachment 10 to the visor "V". The organizer attachment 10 remains in place upon pivoting movement of the visor "V" between a raised, or stowed, position adjacent the ceiling of the vehicle and a lowered, or in-use, position adjacent the front windshield of the vehicle.

Figure 4:
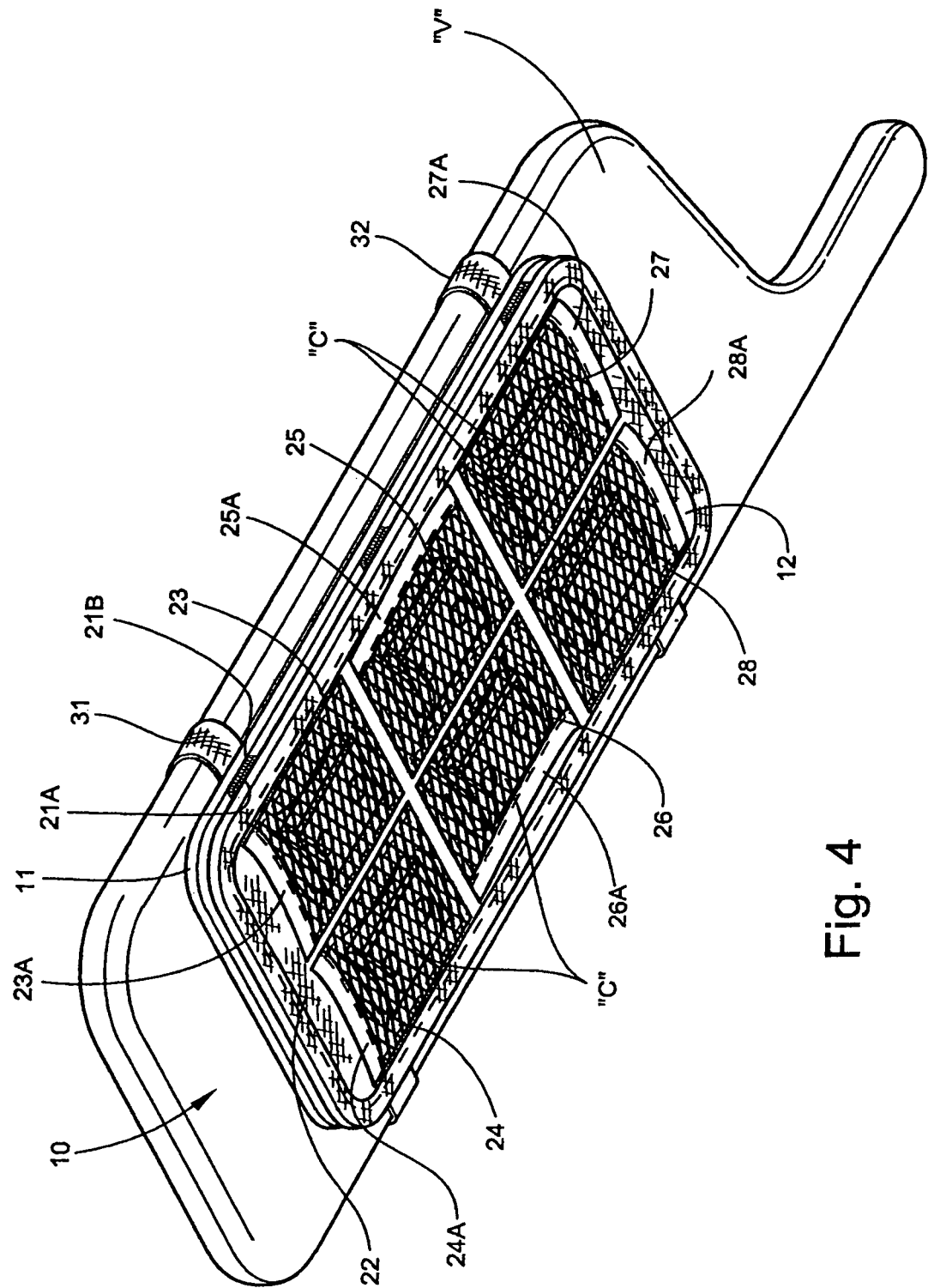
FIG. 4 is a perspective view of the organizer attachment secured to the vehicle visor, and showing the first and second organizer panels in the closed position and the third object storage area available for ready access by an occupant of the vehicle.
Figure 5:
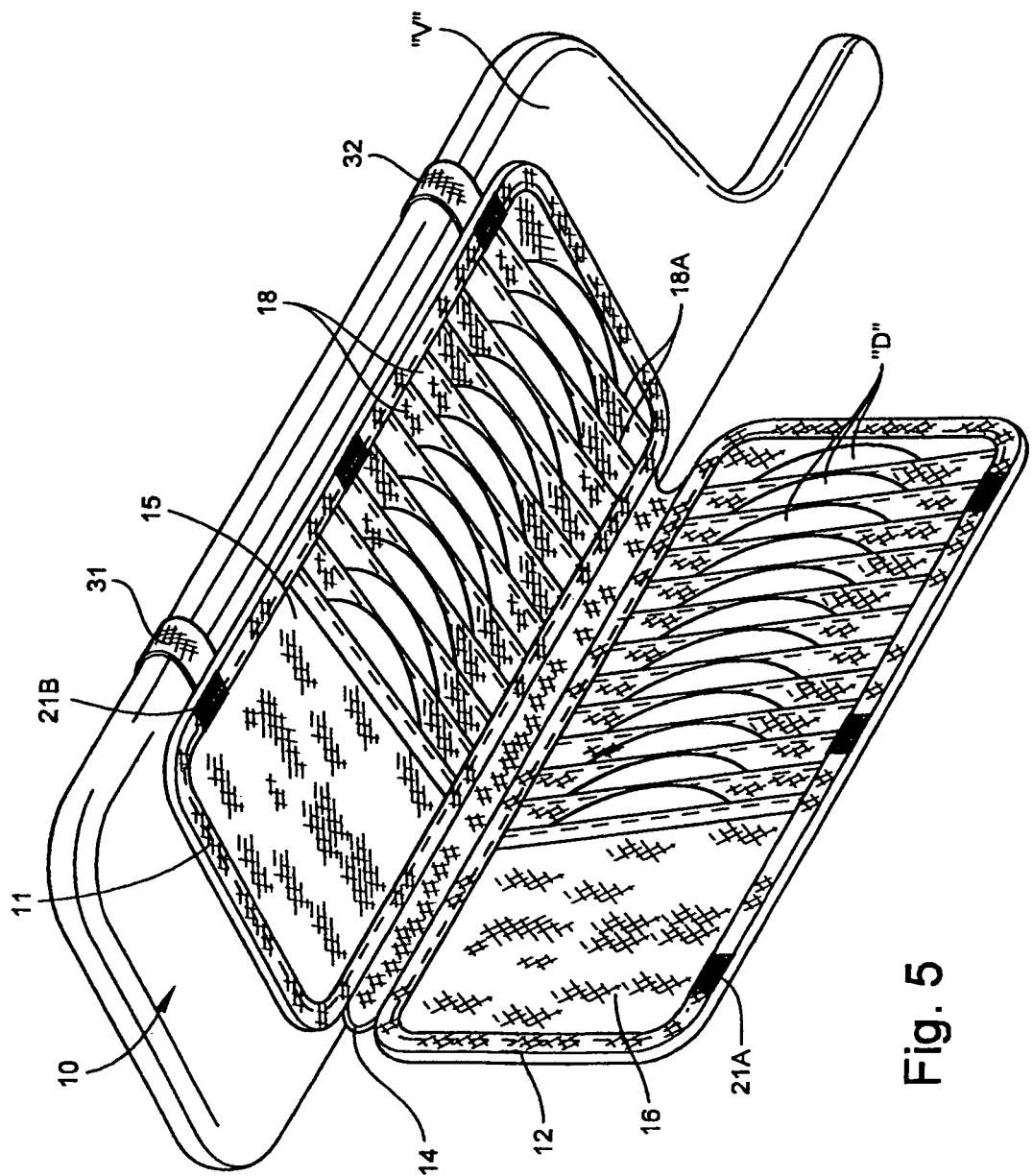
FIG. 5 is a perspective view of the organizer attachment secured to the vehicle visor and showing the first and second organizer panels in the open position for accessing the first, second, and third object storage areas.

Referring to FIGS. 4 and 5, with the vehicle visor "V" in the raised position and the first and second panels 11, 12 closed, as previously described, the third object storage area 22 is located for convenient access to audio cassettes "C" and other objects stored in the pockets 23-28. Because the pockets 23-28 are formed of a "see-through" mesh fabric, the objects can be readily identified without first being removed from the pockets 23-28. The first and second object storage areas 15 and 16 are accessed by releasing the patches 21A and 21B of hook and loop fasteners, and pivoting the second organizer panel 12 downwardly away from the vehicle occupant to an open position shown in FIG. 5. In the open position, the second organizer panel 12 may also function as an auxiliary sun visor.

Figure 6:
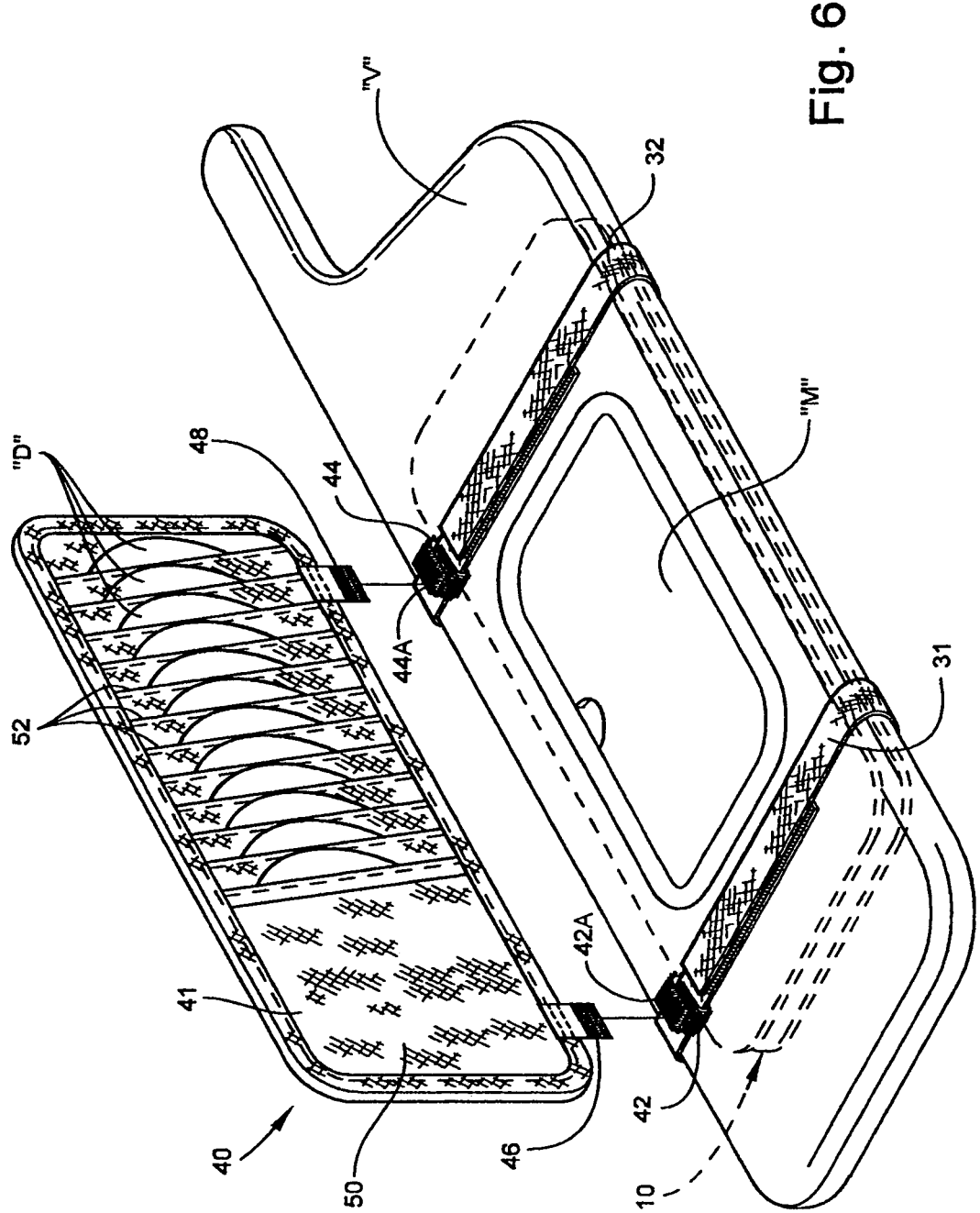
FIG. 6 is a perspective view of a visor organizer attachment according to an alternative preferred embodiment of the invention, and showing the organizer attachment removed from the vehicle visor.

A further embodiment of an organizer attachment 40 according to the present invention is shown in FIG. 6. The organizer attachment 40 comprises a single organizer panel 41 adapted for residing adjacent an inside surface of the vehicle visor "V" and being releasably secured to the straps 31 and 32 of the organizer attachment 10, described above. Removable fastener wraps 42 and 44 with overlying areas of hooks and loops extend around the straps 31, 32, and have respective outside areas 42A and 44A of loops intended to mate with complementary hooks located on tabs 46 and 48 extending from a back edge of the attachment 40. The inside surface of the panel 41 defines an object storage area 50 including CD sleeves 52 especially designed for receiving and carrying compact discs "D". The opposite panel surface may provide an additional object storage area with CD sleeves and/or pockets (not shown). The organizer attachment 40 can be easily lifted in order to use the vanity mirror "M", and is conveniently separated from the visor "V" to carry the stored objects outside the vehicle. While the organizer attachment 40 is described for use in combination with the attachment 10, it is equally applicable for use with any other commercially-available attachment which utilizes straps to secure the attachment the vehicle visor "V".

Figure 7:
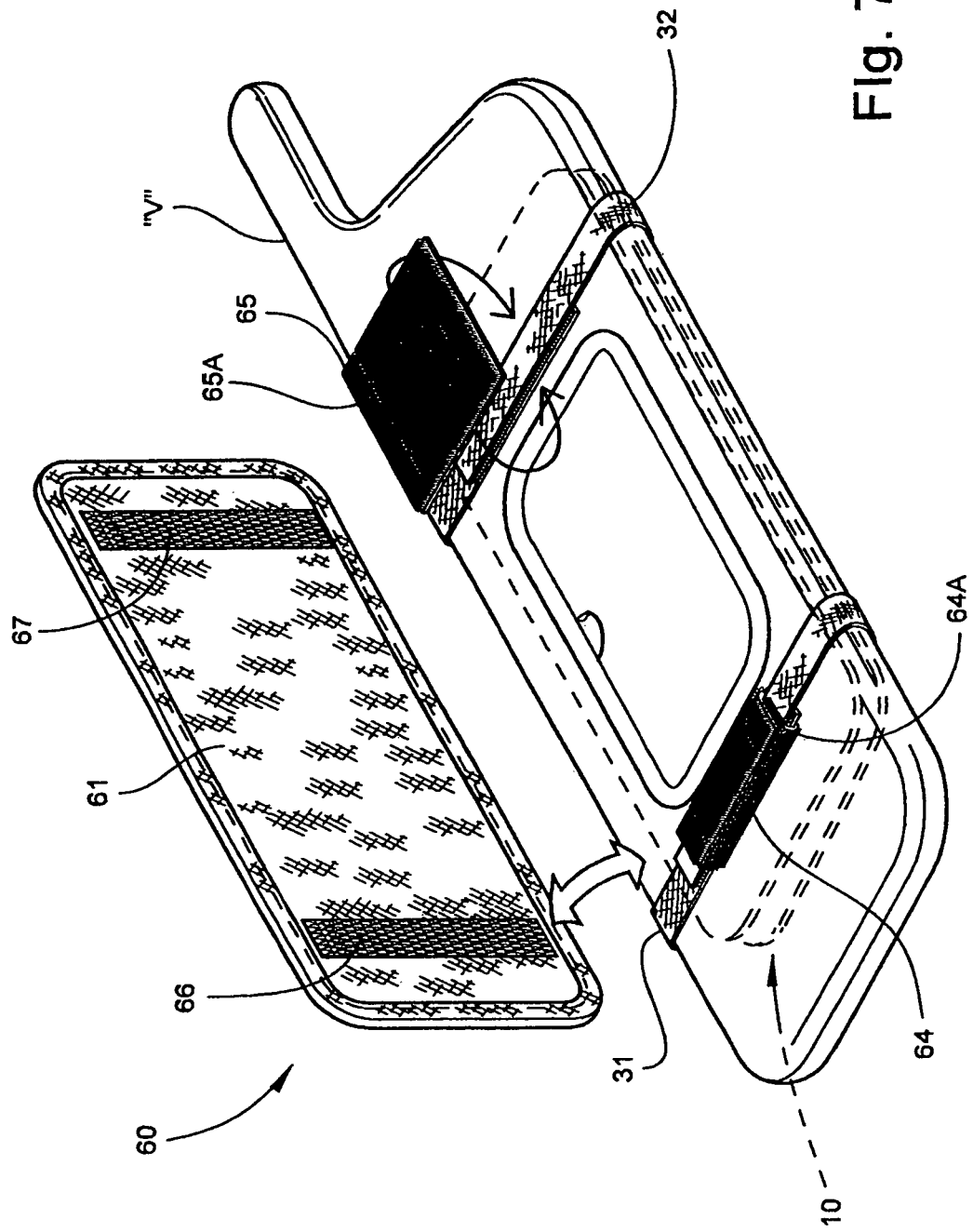
FIG. 7 is a perspective view of an organizer attachment according to a third embodiment of the invention, and showing the organizer attachment released from the vehicle visor.

A third embodiment of the invention is illustrated in FIG. 7. The organizer attachment 60 includes a single organizer panel 61 adapted for residing adjacent an inside surface of the vehicle visor "V" and being releasably secured to the straps 31 and 32 of the organizer attachment 10, described above. Removable fastener wraps 64 and 65 with overlying, mating areas of hooks and loops extend around the straps 31, 32 and have respective outside areas 64A and 65A of loops intended to mate with complementary hooks formed in strips 66 and 67 located on an inside major surface of the panel 61. The fastener strips 66, 67 may encompass the entire inside surface of the panel 61. The outside major surface of the panel 61 defines an object storage area (not shown) including CD sleeves, cassette pockets, zipper pockets, pen holders, and the like.

Figure 8:
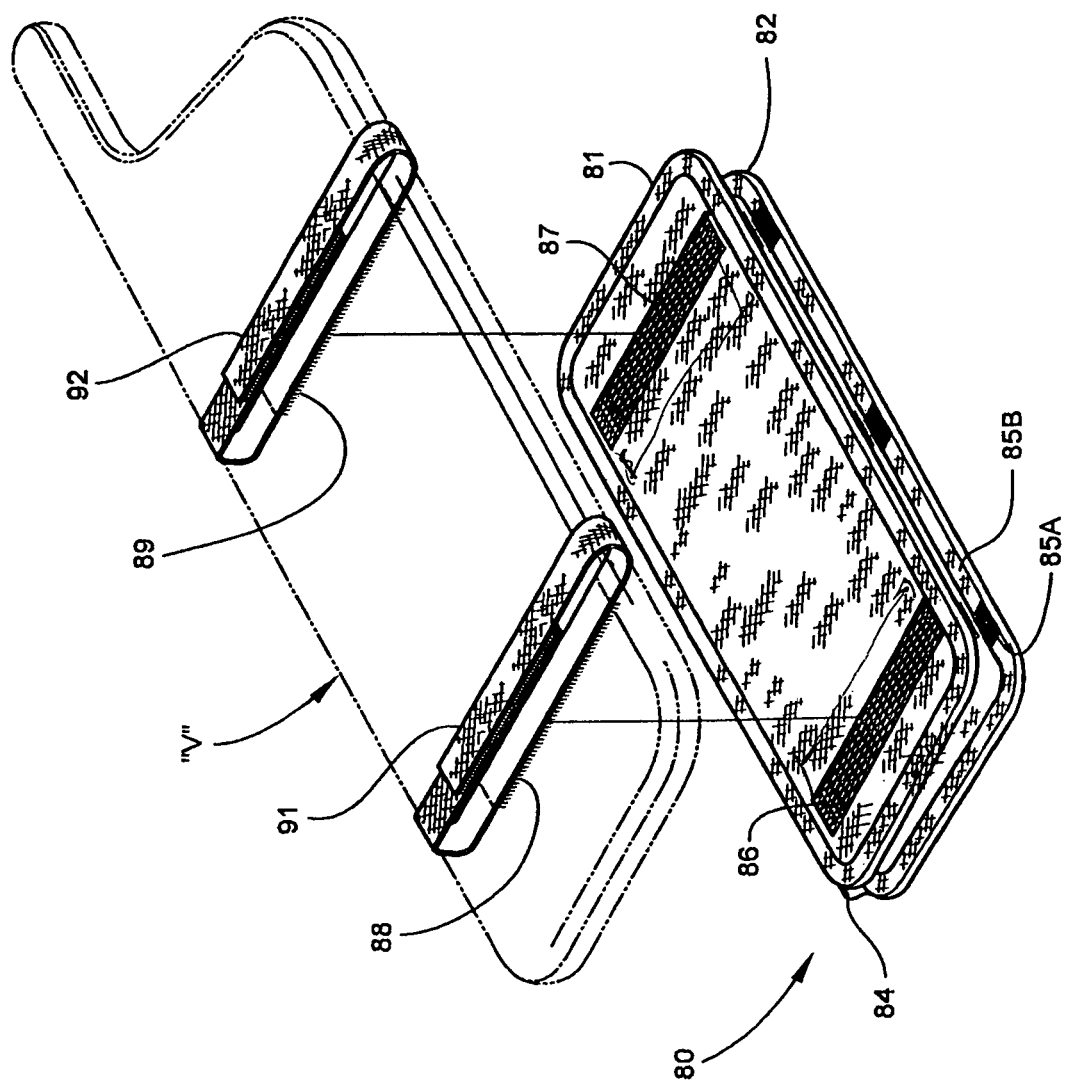
FIG. 8 is a perspective view of an organizer attachment according to a fourth embodiment of the invention with the organizer attachment released from the vehicle visor, shown in phantom.

A fourth embodiment of the invention is illustrated in FIG. 8. Like the organizer attachment 10 described above, the organizer attachment 80 includes first and second organizer panels 81 and 82 interconnected along respective longitudinal edges by a flexible hinge strip 84. Each panel 81, 82 has opposing inside and outside major surfaces. The two inside panel surfaces define respective object storage areas (not shown) including CD sleeves, pockets, pen holders, and the like. Small complementary patches 85A and 85B of hook and loop fasteners, such as VELCRO®, are spaced-apart along marginal inside edges of the first and second panels 81, 82 to releasably fasten the first and second panels 81, 82 together in a closed position.

The outside major surface of the organizer panel 81 includes spaced strips 86 and 87 of hook fasteners adapted for mating with complementary loops 88 and 89 formed on respective straps 91 and 92 extending around the vehicle visor "V". The hooks and loops cooperate to releasably secure the organizer attachment 80 to the visor "V", such that the attachment 80 can be readily removed from the visor "V" and the stored objects conveniently carried outside of the vehicle.

Figure 9:
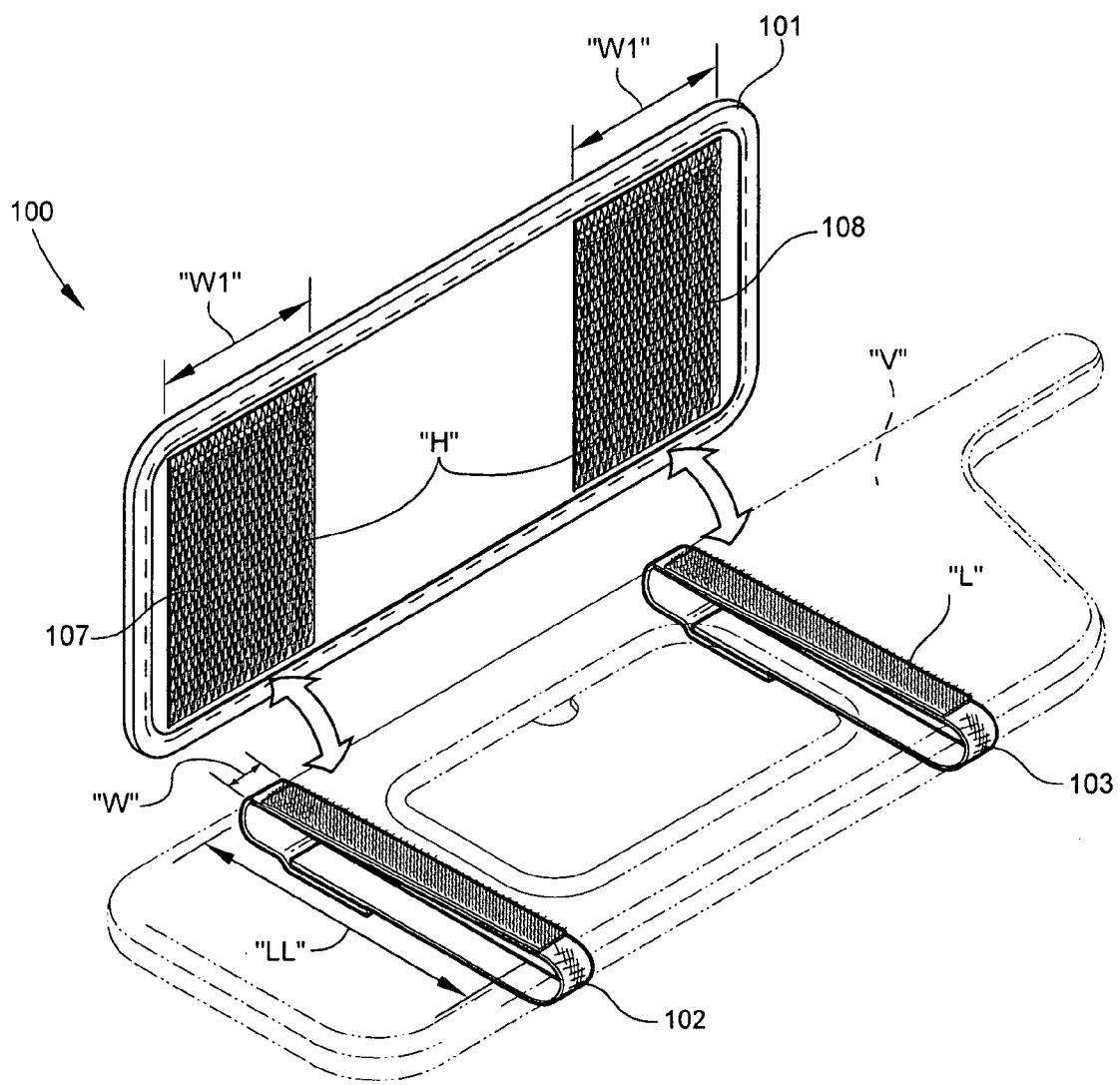
FIG. 9 is a perspective view of an organizer attachment according to a fifth embodiment of the invention with the organizer attachment released from the vehicle visor, shown in phantom.

A fifth embodiment of the invention is illustrated in FIG. 9. The organizer attachment 100 includes an organizer panel 101 adapted for residing adjacent an inside surface of the vehicle visor "V", and being releasably secured to one or more removable and repositionable visor straps 102 and 103. The visor straps 102, 103 comprise respective loops "L" intended to mate with complementary hooks "H" formed in panel strips 107 and 108 located on an planar inside major surface of the panel 101. The mating hooks and loops cooperate to releasably secure the organizer panel 101 to the visor "V", such that the attachment 100 can be readily removed from the visor "V" and conveniently carried outside of the vehicle. The planar outside major surface of the panel 101 defines at least one object storage area (not shown) including CD sleeves, cassette pockets, zipper pockets, pen holders, and the like.

The panel strips 107, 108 are preferably substantially wider than the width of the corresponding visor straps 102, 103. In one exemplary implementation, the loops "L" cover substantially the entire exposed width "W" and length "LL" of the visor strap 102, 103—the length being defined as that portion of the strap 102, 103 extending substantially from one longitudinal side edge of the visor "V" to the other. The width "W1" of each panel strip 107, 108 may be greater than 10% of the width "W" of each strap 102, 103; greater than 20% of the width "W" of each strap 102, 103; greater than 50% of the width "W" of each strap 102, 103 or greater than 75% of the width "W" of each strap 102, 103. The increased area of hook fasteners "H" offers a larger target for readily aligning and releasably attaching the organizer attachment 100 to the loop fasteners "L" of the visor straps 102, 103. Each visor strap 102, 103 may be repositionable on the visor, and may be removably attached by means of mating hooks and loops at opposite free ends. In the case of a closed-loop visor strap (not shown), elastic yarns may serve to frictionally secure the strap to the visor.

Figure 10:
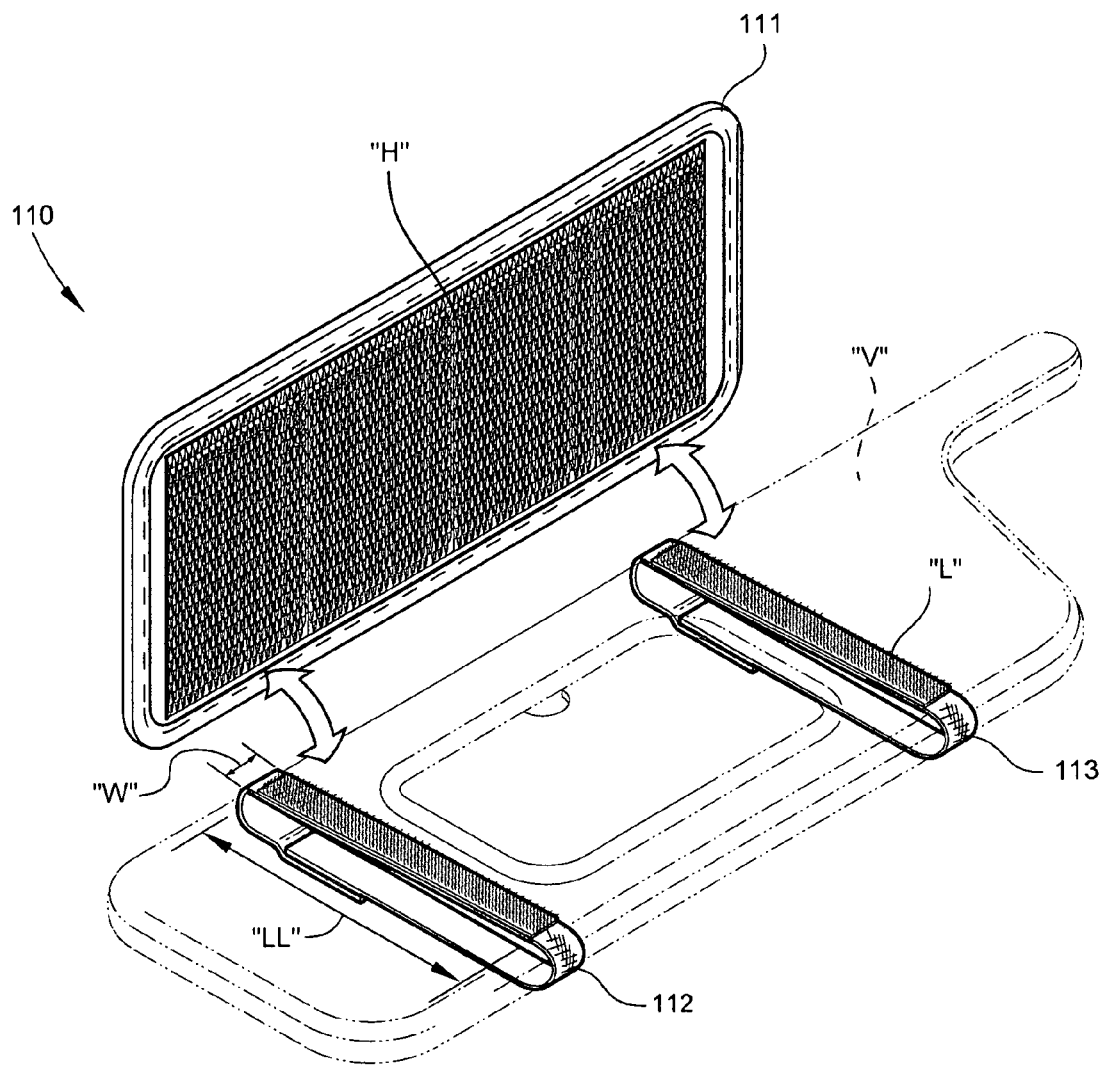
FIG. 10 is a perspective view of an organizer attachment according to a sixth embodiment of the invention with the organizer attachment released from the vehicle visor, shown in phantom.

A sixth embodiment of the invention is illustrated in FIG. 10. The organizer attachment 110 includes an organizer panel 111 adapted for residing adjacent an inside surface of the vehicle visor "V", and being releasably secured to one or more removable and repositionable visor straps 112 and 113. The visor straps 112, 113 comprise respective loops "L" intended to mate with complementary hooks "H" located on a planar inside major surface of the panel 111. The mating hooks and loops cooperate to releasably secure the organizer panel 111 to the visor "V", such that the attachment 110 can be readily removed from the visor "V" and conveniently carried outside of the vehicle. The planar outside major surface of the panel 111 defines at least one object storage area (not shown) including CD sleeves, cassette pockets, zipper pockets, pen holders, and the like.

In one exemplary implementation, the loops "L" cover substantially the entire exposed width "W" and length "LL" of the visor strap 112, 113—the length being defined as that portion of the strap 112, 113 extending substantially from one longitudinal side edge of the visor "V" to the other. Each visor strap 112, 113 may be repositionable on the visor, and may be removably attached by means of mating hooks and loops at opposite free ends. In the case of a closed-loop visor strap (not shown), elastic yarns may serve to frictionally secure the strap to the visor. The hook fasteners "H" of the panel 111 may cover a majority of the entire area of the inside major surface. In the embodiment shown, the area of hook fasteners "H" may extend substantially from one longitudinal side edge of the organizer panel 111 to the opposite side edge, and substantially from one lateral end edge of the organizer panel 111 to the opposite end edge. The increased area of hook fasteners "H" offers a larger target for readily aligning and releasably attaching the organizer attachment 110 to the loop fasteners "L" of the visor straps 112, 113.

In yet another embodiment (not shown), the width of the visor strap may be greater than the panel strip. In this case, the loop fasteners of the visor strap are embodied in a greater fastener area than the area of hook fasteners formed with the panel. The increased fastener area of the strap offers a larger target for readily aligning and releasably attaching the organizer attachment to the visor.

Exemplary embodiments of the present invention are described above. No element, act, or instruction used in this description should be construed as critical or essential to the invention unless explicitly described as such. Various details of the invention may be changed without departing from its scope. Furthermore, the foregoing description of the exemplary embodiments of the invention and best mode for practicing the invention are provided for the purpose of illustration only and not for the purpose of limitation—the invention being defined by the claims and their equivalents.

I claim:

1. An organizer attachment adapted for releasably attaching to a vehicle sun visor, said organizer attachment comprising:
    a rectangular organizer panel having opposing lateral edges and opposing longitudinal edges, the lateral edges being relatively short as compared to the longitudinal edges, and opposing planar inside and outside major panel surfaces, said inside panel surface defining a first fastener area comprising first and second separate, spaced apart, and substantially identical fastener panel strips comprising one of hoop and loop fasteners, said fastener panel strips residing adjacent respective opposing lateral edges, and said inside major panel surface further defining a continuous and uninterrupted fastener-free surface area between said first and second fastener panel strips, said fastener-free surface area being greater than a surface of area of either one of said fastener panel strips, and each fastener panel strip comprising a continuous and uninterrupted area of fasteners extending from one longitudinal edge of said organizer panel to the opposite longitudinal edge of said organizer panel;
    first and second visor straps separate and detachable from said organizer panel, and adapted for being secured to the sun visor, each visor strap defining a second fastener area comprising one of hook and loop fasteners releasably mating with a corresponding one of said first and second fastener panel strips of said organizer panel, such that said organizer attachment is readily removed from the sun visor and said visor straps for transport outside of the vehicle; and
    each fastener panel strip having a width dimension greater than a width dimension of a corresponding visor strap.

2. An organizer attachment according to claim 1, wherein the first fastener area of said organizer panel is at least 10% greater than the second fastener area of said visor straps.

3. An organizer attachment according to claim 1, wherein the first fastener area of said organizer panel is at least 20% greater than the second fastener area of said visor straps.

4. An organizer attachment according to claim 1, wherein the first fastener area of said organizer panel is at least 50% greater than the second fastener area of said visor straps.

5. An organizer attachment according to claim 1, wherein the first fastener area of said organizer panel is at least 75% greater than the second fastener area of said visor straps.

6. An organizer attachment according to claim 1, wherein the first fastener area of said organizer panel occupies a majority of the entire inside surface area of said organizer panel.

7. An organizer attachment according to claim 1, wherein the second fastener area of said visor straps is adapted to extend substantially from one longitudinal side edge of the visor to an opposite longitudinal side edge of the visor.

* * * * *